United States Patent
Burukhin et al.

(10) Patent No.: US 11,630,681 B2
(45) Date of Patent: Apr. 18, 2023

(54) INTEGRATED SYSTEM FOR LOCALIZATION OF RESOURCES TAILORED FOR TRANSLATIONS BY SETTING A FLAG

(71) Applicant: MICROSOFT TECHNOLOGY LICENSING, LLC, Redmond, WA (US)

(72) Inventors: Anatoliy Burukhin, Redmond, WA (US); Rory Keary, Seattle, WA (US); Richard Paul White, Redmond, WA (US); Patrick Francis Murphy, Dublin (IE); Wei Liu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 497 days.

(21) Appl. No.: 16/566,667

(22) Filed: Sep. 10, 2019

(65) Prior Publication Data

US 2021/0073013 A1 Mar. 11, 2021

(51) Int. Cl.
*G10L 19/00* (2013.01)
*G06F 16/33* (2019.01)
(Continued)

(52) U.S. Cl.
CPC ............ *G06F 9/454* (2018.02); *G06F 16/128* (2019.01); *G06F 40/47* (2020.01)

(58) Field of Classification Search
CPC ..... G06F 16/3337; G06F 40/263; G06F 9/454
(Continued)

(56) References Cited

U.S. PATENT DOCUMENTS 6,442,516 B1* 8/2002 Lee .................... G06F 9/454
704/8
8,615,732 B2 12/2013 Kaneko et al.
(Continued)

OTHER PUBLICATIONS

"Continuous Localization", Retrieved from: https://docs.weblate.org/en/latest/admin/continuous.html, Jul. 22, 2019, 8 Pages.
(Continued)

*Primary Examiner* — Farzad Kazeminezhad
(74) *Attorney, Agent, or Firm* — NovoTechIP International PLLC

(57) ABSTRACT

A method for localizing a software resource in a second language is disclosed. The method may include receiving a software resource in a first language, receiving data relating to a state of translations performed for the software application by a localization service, determining based on the software resource in the first language and the data whether an up-to-date software resource in a second language exists in a data store where the software resource in the second language corresponds to the software resource in the first language. Upon determining that the up-to-date software resource in the second language exists, utilizing the up-to-date software resource in the build process, and upon determining that the up-to-date software resource does not exist in the data store, sending a request to the localization service to create the up-to-date software resource in the second language, and upon creation of the up-to-date software resource receiving a link to a location of the software resource in the data store.

20 Claims, 4 Drawing Sheets

(51) Int. Cl.
*G06F 40/263* (2020.01)
*G06F 9/451* (2018.01)
*G06F 16/11* (2019.01)
*G06F 40/47* (2020.01)

(58) Field of Classification Search
USPC .......................................... 707/748; 704/3, 8
See application file for complete search history.

(56) References Cited

U.S. PATENT DOCUMENTS

| | | | |
|---|---|---|---|
| 8,639,701 B1* | 1/2014 | Lim | .................... G06F 16/3337 |
| | | | 707/748 |
| 9,405,532 B1 | 8/2016 | Sullivan | |
| 9,442,744 B2 | 9/2016 | Lerum et al. | |
| 9,772,840 B2 | 9/2017 | Zhang et al. | |
| 2006/0206877 A1 | 9/2006 | Kohlmeier et al. | |
| 2009/0222787 A1 | 9/2009 | Aldahleh et al. | |
| 2009/0282394 A1 | 11/2009 | Raj | |
| 2009/0287471 A1* | 11/2009 | Bennett | ................. G06F 40/263 |
| | | | 704/3 |
| 2011/0119676 A1 | 5/2011 | Gallant et al. | |
| 2013/0226555 A1 | 8/2013 | Lerum et al. | |
| 2014/0372098 A1 | 12/2014 | Arseniev et al. | |
| 2016/0092440 A1 | 3/2016 | Bhuvaneswaran | |
| 2017/0322820 A1 | 11/2017 | Dmytryshyn | |
| 2018/0052827 A1 | 2/2018 | Mathada et al. | |

OTHER PUBLICATIONS

"Lokalise", Retrieved from: https://web.archive.org/web/20190507150217/https:/lokalise.co/, May 7, 2019, 7 Pages.
"Smartcat Connectors to CMS and Code Repositories", Retrieved from:https://www.smartcat.ai/integrations/, Jul. 22, 2019, 6 Pages.
"Transifex", Retrieved from: https://web.archive.org/web/20190716101528/https:/www.transifex.com/, Jul. 16, 2019, 11 Pages.
"International Search Report and Written Opinion Issued in PCT Application No. PCT/US2020/038283", dated Oct. 19, 2020, 12 Pages.

* cited by examiner

INTEGRATED SYSTEM FOR LOCALIZATION OF RESOURCES TAILORED FOR TRANSLATIONS BY SETTING A FLAG

TECHNICAL FIELD

This disclosure relates generally to localization of software resources, more particularly, to an integrated method of and system for providing software localization.

BACKGROUND

Many software applications are used in several different countries around the globe. In these different markets, users may speak languages that are different from the language the software product was developed in or the initial market it was provided to. As a result, software products marketed to users who speak a different language are typically localized in the users' languages. This often requires that software resources of these applications be localized in all the languages the application is offered in.

Different mechanisms have been developed to provide software localization in different languages. One of these approaches involves treating translations as source code stored in a repository. This allows for versioning of translation changes and as a result versioning of the build output and product releases for a software product. However, providing translations in this manner may require a significant amount of storage space. Furthermore, because localized resources are frequently updated with translations from different languages, keeping the translations up to date may require frequent source code updates that consume a significant amount of computer resources (e.g., memory and bandwidth).

Hence, there is a need for an integrated method and system for providing software localization.

SUMMARY

In one general aspect, the instant disclosure presents a data processing system having a processor and a memory in communication with the processor where the memory comprises executable instructions that, when executed by the processors, cause the data processing system to perform multiple functions. The function may include receiving a software resource in a first language, the software resource being a resource used in a build process for a software application; receiving data relating to a state of translations performed for the software application by a localization service; and determining based at least in part on the software resource in the first language and the data whether an up-to-date software resource in a second language exists in a data store, where the software resource in the second language corresponds to the software resource in the first language. Upon determining that the up-to-date software resource in the second language exists in the data store, the functions may include utilizing the up-to-date software resource in the build process, and upon determining that the up-to-date software resource in the second language does not exist in the data store, sending a request to the localization service to create the up-to-date software resource in the second language. Upon creation of the up-to-date software resource in the second language, the functions may include receiving a link to a location of the up-to-date software resource in the second language in the data store.

In yet another general aspect, the instant application describes a method for providing a software resource in a second language, the software resource corresponding to a software resource in a first language. The method may include receiving a software resource in a first language, the software resource being a resource used in a build process for a software application; receiving data relating to a state of translations performed for the software application by a localization service; and determining based at least in part on the software resource in the first language and the data whether an up-to-date software resource in a second language exists in a data store, where the software resource in the second language corresponds to the software resource in the first language. Upon determining that the up-to-date software resource in the second language exists in the data store, the method may include utilizing the up-to-date software resource in the build process, and upon determining that the up-to-date software resource in the second language does not exist in the data store, sending a request to the localization service to create the up-to-date software resource in the second language. Upon creation of the up-to-date software resource in the second language, the method may include receiving a link to a location of the up-to-date software resource in the second language in the data store.

In a further general aspect, the instant application describes a non-transitory computer readable medium on which are stored instructions that when executed cause a programmable device to receive a software resource in a first language, the software resource being a resource used in a build process for a software application; receive data relating to a state of translations performed for the software application by a localization service; and determine based at least in part on the software resource in the first language and the data whether an up-to-date software resource in a second language exists in a data store, where the software resource in the second language corresponds to the software resource in the first language. Upon determining that the up-to-date software resource in the second language exists in the data store, the instructions cause the programmable device to utilize the up-to-date software resource in the build process, and upon determining that the up-to-date software resource in the second language does not exist in the data store, send a request to the localization service to create the up-to-date software resource in the second language. Upon creation of the up-to-date software resource in the second language, the instructions cause the programmable device to receive a link to a location of the up-to-date software resource in the second language in the data store.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
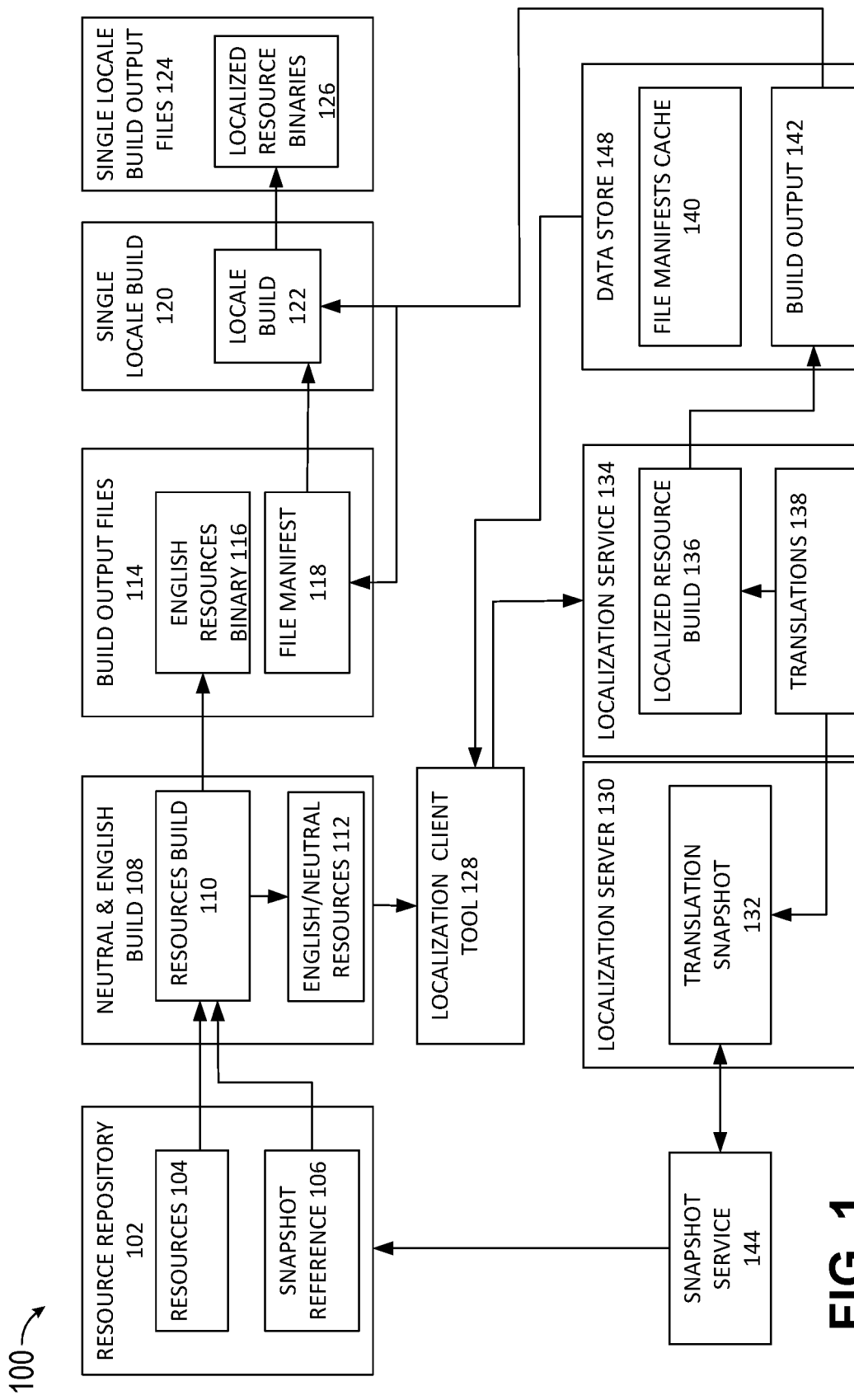
FIG. 1 depicts an example operational system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

In today's computing environments, many software applications are localized in several different languages. For example, some Microsoft Office® applications are localized in more than 100 languages. Traditionally, localizations are performed by merging English resources and translations during build. However, localizing software products via use of English resources and translations in a repository poses several technical problems. First, localizing software products in this manner often involves redundant replication of complex localization infrastructure in every localized software product. Second, the localization usually requires frequent updates of translations in every code repository. When a program is localized in several different languages, these translation updates contribute to a significant percentage of repository updates. Furthermore, localized resources occupy a large amount of memory space and because they are often replicated on build and developers' computers, they may cause network traffic and increased requirements for development computers. Still further, localization tribal knowledge may keep product developers out of localization projects. This could cause many issues as localizers may not have appropriate expertise in testing, maintenance and deployment of the products.

To address these technical problems and more, a localization service may be used to provide localization of software. In one implementation, the localization service may receive a resource in a first language and localize it in other languages. Using a service increases storage efficiency and reduces the need for frequent source code updates. Furthermore, a localization service may provide a simple uniform platform for localization across different languages. However, the localization service is a live service and as such does not incorporate versions. As a result, the state of translations within the localization service may not be defined. This may cause the same resource in the first language to produce different outputs in a second language. For example, a new string in English may remain in English for some time until a localization vendor translates it. However, the translation event is not connected through versioning to an application build. Thus, the same application build could receive different localized resources. This may cause technical issues with respect to consistency.

To address these technical problems and more, in an example, this description provides a technical solution for connecting an indeterministic service to versioned application resources. To improve the current methods of software localization, an integrated system may be used that combines the use of a localization service with version control to provide seamless localization services without the need for dedicated localization teams. Thus, the technical solution offers a highly efficient mechanism for localizing software applications.

As will be understood by persons of skill in the art upon reading this disclosure, benefits and advantages provided by such technical solutions can include, but are not limited to, a solution to the technical problems of inefficient, computer and human resource-intensive localization of software applications. Technical solutions and implementations provided herein optimize and improve the process of providing localized software application resources. The benefits provided by these technical solutions include providing increased efficiency in building and developing software applications.

FIG. 1 illustrates an example operational system 100, upon which aspects of this disclosure may be implemented. The system 100 may be part of a build environment hosted on a build platform to build one or more software applications. The applications may include a variety of elements such as resources and software code that together form a program or suite of programs. Various processes may be carried out in a build environment with respect to an application in order to produce an application package, such as compiling code, packaging binary code, retrieve and utilizing resources, and retrieving and utilizing localized resources when needed.

As part of a build environment, a build platform may include or may have access to one or more services that assist in performing some of the processes involved with producing an application package. The system 100 depicts one such service for providing localized resources for applications.

System 100 may include a resource repository 102 containing resources 104 and snapshot references 106. Resource repository 102 may be used to store the resources 104 necessary for an application. In one implementation, resources 104 include those that are language-neutral and/or are in a default language such as English (e.g., English resources). Neutral language applications may build neutral code binaries and/or English resource binaries. Applications offered in second languages may then build localized resources for many different languages (e.g., 100 languages) based on the neutral and/or English build. It should be noted that while English is used herein to refer to the default language, other languages may also be used as the default language. Separating locale builds may be advantageous in improving the build time. However, building many localized binaries in each different language may take a long time. As a result, second language builds may be structured in subprojects per locale, and developers can build a subset of locales if needed.

To keep the core builds of an application that is being built performant and keep the size of resource repositories minimal, the resource repository 102 may only store language-neutral and/or English resources in resources 104. This may ensure that continuous translation updates do not affect the resources 104 stored in the resource repository 102. Instead, the resource repository 102 may make use of a snapshot reference 106 which provides an up to date reference (e.g., pointer) to a translation snapshot. A snapshot may refer to an identifiable copy of the most recent translations at a certain time (e.g., the time a request for creating a snapshot is received), and as such may include the state of resource translations at the time. In one implementation, every snapshot has an identifier which is referred to herein as a reference.

The snapshot may be provided by a snapshot service 144 communicatively connected (e.g., via a network) to the resource repository 102. The snapshot service 144 may function to send a request to the localization server 130 which includes or is connected to the localization service 134. The request may be for creating a snapshot of the latest translations. In return, the snapshot service 144 may receive a reference (e.g., identifier) for the latest snapshot. In one implementation, the reference is a file containing the identifier for the latest snapshot along with the identifiers of individual resource files in the snapshot. In an example, the reference file is a Json file and is referred to as the snapshot manifest. The reference file may be sent by the snapshot service 144 to the snapshot reference 106 which may store the reference file for use in building the application package, as discussed further below. Thus, the snapshot service 144 may connect the translation snapshot 132 with the snapshot reference 106.

The system 100 includes a neutral and/or English language build 108 which may obtain neutral and/or English language resources from the resources 104 of the resource repository 102. The obtained resources may then be preprocessed, when needed, by the English resources build 110 to prepare the set of English and/or neutral language resources 112. The preprocessing may be needed because some resource types are not suitable for localization in their authoring format. These resource types may require some preprocessing based on their type to prepare them for use in localization. The type of preprocessing performed may vary depending on the type of resource.

Once the resources are preprocessed and are in a format that can be used in localization, the English and/or neutral resources 112 may be transmitted from the neutral and/or English language build 108 to the localization client tool 128. The localization client tool 128 may in turn transmit these resources to the localization service 134 for further processing.

In one implementation, in addition to the English and/or neutral resources 112, the neutral and/or English language build 108 may also transmit other data to the localization client tool 128. The data may include a build version for the resources submitted. This may be because when resource files in the resources 104 or the English/neutral resources 112 are submitted to the localization service 134, unless additional information is provided, they may all be used to request translations. For example, the localization service 134 may submit all recent files to translation vendors. However, not all resources in the English/neutral resources 112 may require translations. For example, some may be files from old builds of the application. Others may be temporary resource files, for example, from developers' computers. Thus, additional information may be needed to determine which resource files should be used for translations. This may be done in a number of different ways.

One approach for determining which resource files in the list of English/neutral resources 112 should be used for translations, may involve utilizing a build version to detect official builds. This may be done for applications in which a range of version numbers are used to distinguish between different types of builds. For example, some application packages may utilize version numbering to distinguish official builds from those on developers' computers. In such instances, the version numbers may be used to detect from the resources build 110 which ones of the English/neutral resources 112 belong to an official build and thus require translations. In one implementation, detecting which resources require translation is done by the localization client tool 128. This may be achieved by setting a flag that indicates to the localization service 134 the resource file is a localization target suitable for translation and as such appropriate for handing off to a translation vendor. The flag may be referred to as a localization target flag. In an example, the localization target flag is set by the localization client tool 128 when the build is an official build and the resources should be submitted for translation. When the localization flag is not set (e.g., it is not set), it indicates that the resource file is associated with a developer's local build or another build where the resources should not be submitted for translation. In this manner, even if a resource file that does not require translation is sent to the localization service 134, it would be easy to identify the resource file and set it aside.

In addition to the build version information, the neutral and/or English build 108 may also transmit information regarding the snapshot reference 106 to the localization client tool 128. In one implementation, the information consists of the snapshot reference file which represents translations at the time when the snapshot that corresponds to the current build was created.

Utilizing the snapshot reference and the snapshot service 144 along with the localization service 134 in the integrated 100 is advantageous for several reasons. One of the main characteristics of some application build environments is that they can receive the same versions of input files from a repository and rebuild the same build version of an application by producing the same output. As such the build output may be deterministic. The external localization service 134, however, may not keep translations in a source repository. The localization service may be a live service that does not incorporate versioning. Instead, it may store the translations in a database. As a result, if a translation is updated, the next build may utilize the most recent translation. This would result in the build environment producing different outputs based on the same input which may cause many technical problems. To avoid this, the snapshot service is used to create translation snapshots that include a state of translations at a given time. In this manner, the snapshot reference file in the repository may be connected to translations in the localization service 134. The information in the snapshot reference file may then be used for applications that require deterministic output to ensure that same resources are used in building the same version of an application. This may mean that during a build, translations are not used from a live database. Instead they may be retrieved from the snapshot, as need.

Once all required information is received by the localization client tool 128, it examines the resources received to determine if localized resources are already available for them. This may be done by the localization client 128 creating a link based on the resources, the snapshot reference file and the localization target. The link may be created from the English resource file hash, snapshot ID of the reference file and some additional data. The localization client 128 may then try to download the manifest file for the resource via the generated link from the data store 148. If localized resources are already available in the data store 148 for the received English and/or neutral resources, the localization client tool 128 may pass the manifest file which is the target file for the localization operation to the application build which may utilize the files. In this manner a call to the localization service 134 may be bypassed via caching. This may significantly increase efficiency. In one example, only 0.16% of an application build requests are directed to the localization service 134. In another example, only 1 in 80 build machines may actually require the localization service. The reduced number of calls to the localization service may help reduce the load of the service and as such may significantly improve performance of the build environment. This is because the localization client tool 128 may simply make the retrieved localized resource files available instead of requiring the localization service to rebuild them every time. The caching process also makes utilizing the last known good output approach possible, as discussed further below. Furthermore, if reverting a resource change is needed, it can simply be done by redirecting the build to the cache.

When, however, localized resources are not available for one or more resources in the list of English/neutral resources 112, the localization client tool 128 may proceed to send a request to the localization service 134 to request localization for those resources. In one implementation, the request may involve a call to the localization service 134. In an example, the request may include data regarding the English/neutral resources 112 along with the localization target flag.

The localization service 134 may be a service external to the build platform and/or build environment, as such may be hosted by an external server such as the localization server 130. Once the localization service 134 receives a call from the localization client tool 128, it may transmit a request to a local vendor for providing translations for resources that have not been translated yet. For example, situations in which a request may be transmitted to a vendor may include when resources are being built for a new application, an application is being produced in a language in which it has not been offered before, or if new resources have been added to an existing application for which translations have not been done before. In each of these instances, a request may be submitted to a vendor (not shown) which may provide translations 138. In other instances, updated translations may be provided periodically as need arises. These translations 138 may be provided to the translation snapshot 132 to provide a latest of translations when requested by the snapshot service 144.

The localization service 134 may utilize a localized resource build 136 to create resource build outputs that are generated based on the translations 138 and the input English/neutral resources 112, among other data. The resource build outputs may then be transmitted by the localization service 134 to the data store 148 for storage and use in the future. In one implementation, after generating the localized resource build outputs, the localized resource build 136 may transmit the build outputs to the build output 142 for storage. Accordingly, the build output 142 may contain copies of the latest localized resource builds. In one implementation, the build output 142 may be a cache storage.

In addition to generating the localized resource builds, the localization service 134 may also prepare a list of links associated with the translated resources stored in the build output 142. In one implementation, the list may be provided in a file (e.g., a Json file) which may provide links to each of the localized resource build outputs in the cache. The file may be referred to as a file manifest and be transmitted as the file manifest 118 to the neutral and English build output files 114. The file manifest 118 may link together the English resource files, a translation state for the localized resources, and cached localized resources (cached targets). In one implementation, the file manifest 118 may be transmitted from the data store 148 to an element of the build environment such as the build output files 114. Alternatively, the file manifest 118 may be transmitted directly from the localization service 134 to an element of the build environment such as the build output files 114. In one implementation, the localization client tool 128 may also receive a copy of the file manifest and upload it to the file manifests cache 140 in the data store 148.

Once the file manifest 118 is received by the build environment, it may be transmitted to the single locale build 120 for further processing. Single locale may refer to a single language build that is built for a single language specific to a particular region. For example, English may have variations for different regions that include en-US (for US English), en-GB (for Great Britain English), and en-AU (for Australian English). As a result, translations for those different regions may be different based on each locale.

The single locale build 120 may include a locale build 122 which receives the file manifest 118 from the build output files 114, examines the links in the file manifest 118, and retrieves the localized resource build outputs from the build output 142 using those links. The retrieved localized resource build outputs may then be sent from the single locale build 120 to the single locale build output files 124 which may process them as needed to create the localized resource binaries 126 for use in preparing the application.

Thus, instead of generating translations for localized resources within the build environment which may lead to inefficient storage and communication issues, the technical solution may make use of an external localization service. This localization service may provide a single unified localization system to replace multiple disparate client-side implementations of localization tools. This localization service when combined with client-side wrapper elements may allow any build system to easily connect to the localization service. Furthermore, the localization service may provide a highly efficient mechanism that is suitable for build automation and functions well from a build support perspective in an application build environment.

It should be noted that various elements shown in system 100 may be resident on various servers, data stores and client devices (not shown). Each of these elements may communicate with each other locally or via one or more wired or wireless networks. Although shown as separate elements, the localization service 134 may be hosted by the localization server 130. Furthermore, the translations 138 and translation snapshot 132 may be stored in a data store connected to the localization server 130. In one implementation, the translations 138 and/or translation snapshot 132 may be stored in the data store 148. Furthermore, although displayed as one data store, the data store 148 may include multiple different data stores.

The use of the external localization service provides many advantageous. However, because the localization service is an external service which may have downtime or may otherwise misfunction at times, the technical solution includes several options for keeping the build process functioning even when the localization service is not working properly. One such approach involves bypassing the localization service. In such a scenario, the build may replace the file manifest with English and/or neutral resources. As a result, the output of all locale builds may become English. This approach may be used on a temporary basis. For example, it may be used while testing a new localization project without connecting the build to the localization service. As a result, the localization project may be built for test purposes without delay.

A second approach for downtime management may involve using the last known good outputs. This may be done by obtaining the outputs from the file manifests cache 140 instead of calling the localization service 134. In an example, upon determining that the localization service 134 is not functioning properly, the localization client tool 128 may send a request to the file manifests cache 140 to obtain the output files. If localized resources have not had any updates since the last build, the file manifests cache 140 would be up to date and the localization service 134 may not even be needed. However, even if there have been changes and updated resources are needed, the localization client tool 128 may use the latest cached output for the input resources temporarily. The latest cached output may not reflect all the input resources or latest translations, but in most cases, it is enough for keeping the application build running even if the localization service is offline. In one implementation, to ensure that developers are aware of the issue, triggering the use of the last known good output may not be done automatically. For example, this may only be initiated manually. In an example, a build created using this approach may be marked as not being suitable for release to customers. In another example, initiating this approach may automatically trigger a fallback mechanism which informs developers of the issue. In one implementation, the fallback mechanism automatically escalates the failure to the build team as a top priority issue.

In addition to the advantages discussed above, the technical solution also resolves technical problems such as client-server latency, volume of network traffic and other build performance issues. In one implementation, utilizing the links to localized resources instead of retrieving all the resources in one core build, prevents the need for downloading all the localized resources from the build output files 114 (e.g., the core build). Instead, only a few computers that are involved in building all locales may need to download the resource output files. This may decrease network traffic and help avoid other performance issues. Another advantage offered by the technical solution is saving time by allowing the core build to work on creating output files while the localization service is creating the requested localized resources. This is because the time period between when the localization client tool 128 makes a request for localized resources and when it receives the links to those resource may be long. However, during this period, the build environment may continue with the build process in parallel by for example creating the English resource binary 116, while waiting for the localized resources. This may save time and computer resources.

Figure 2:
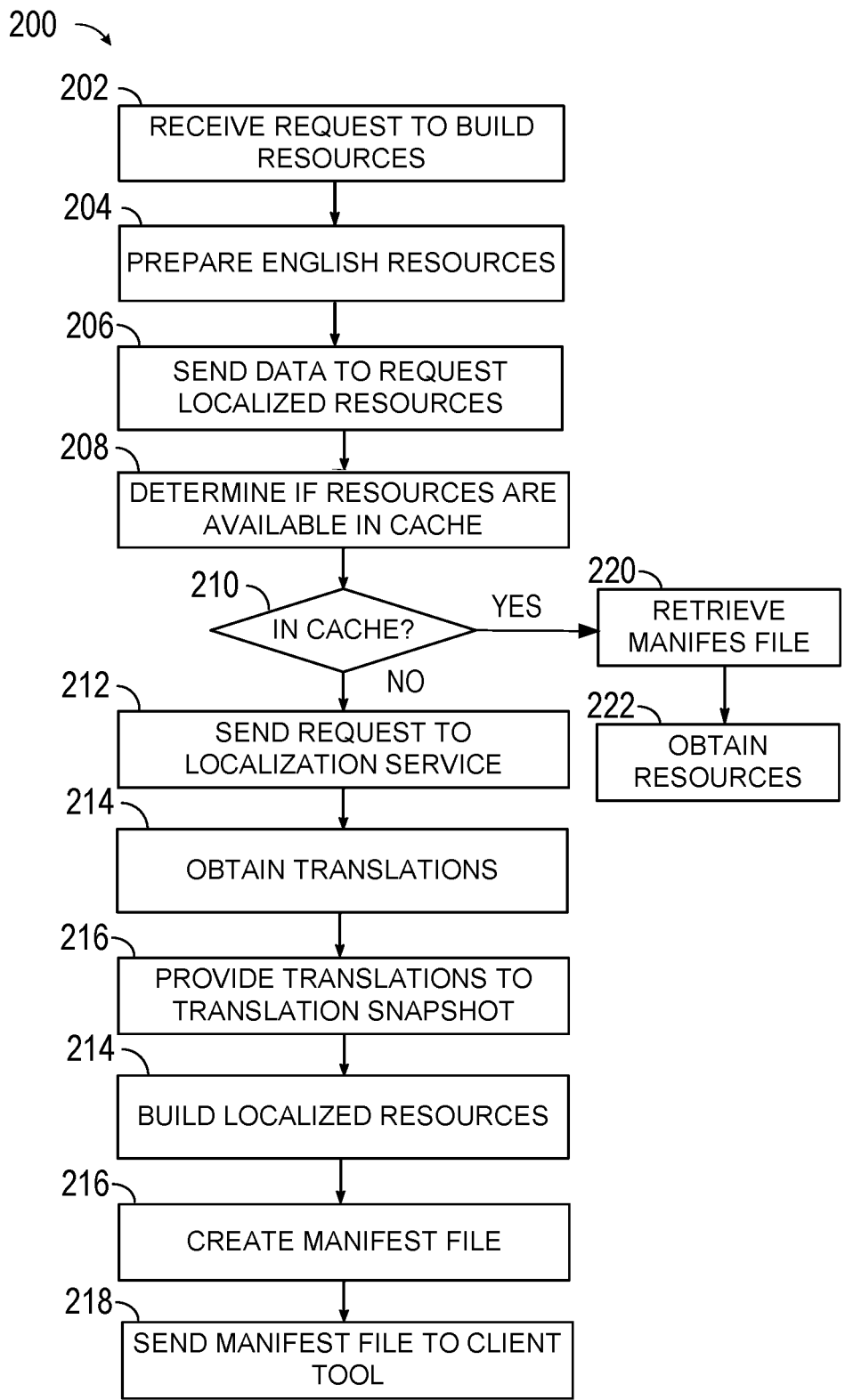
FIG. 2 is a flow diagram for providing localized resources via a localization service during an application build process.

FIG. 2 is a flow diagram depicting an example method 200 for providing localized resources via a localization service during an application build process. At 202, method 200 may begin by receiving a request to build one or more localized resources that correspond to neutral and/or English resources (or any other default language resources) stored in a repository. Upon receiving the request, the English and/or neutral language resources may be prepared via a preprocessing operation, at 204, to ensure that the resource files are in proper format to be sent for localization. Once the resources are prepared, method 200 may proceed to send data to request localization for the resources, at 206. In one implementation, the request may be sent from the build to the localization client tool and may include the snapshot reference file which represents the state of translations at the time when the file was created. In an example, the request may also include the localization target flag to indicate when the build is official and thus the resources should be submitted for localization. The localization client tool may then determine, based on the received information, whether a localized resource using the latest translation already exists in the cache for the English resource, at 208. This process may be performed, as discussed above in detail.

When it is determined, at 210, that the localized resources for the English and/or neutral language resources are available in cache, method 200 may proceed to retrieve the manifest file containing the link for the resources, at 220. This may be done by the localization client tool which may transmit the file manifest to the build. The build may then utilize the links in the file manifest to obtain (e.g., download) the localized resource files from a build output cache in the data store, at 222.

When, however, it is determined, at 210, that the localized resources for the English and/or neutral language resources are not available in cache, method 200 may proceed to send a request to the localization service for localizing the resources, at 212. In response, the localization service may obtain translations for the English resources, at 214. This may be done by sending a request to one or more local vendors to translate the English strings in the English resources. Once the translations are obtained by the localization service, method 200 may proceed to provide the translations to a translation snapshot cache, at 216. The translation snapshot cache may in this manner keep a record of the latest translations, which may enable it to provide the state of the translations to the snapshot service, when needed.

The obtained translations may also be used by the localization service to build localized resources, at 214. In one implementation, a copy of the localized resources may be stored by the localization service at the localization server that hosts the service. Furthermore, copies of the built localized resources may be provided by the localization service to a data store for storage and caching. After storing the localized resources at the data store, the localization service may also create a manifest file containing links to each of the localized resources, at 216. The manifest may then be transmitted to the localization client tool which may send it the build environment for further processing, as discussed above.

Figure 3:
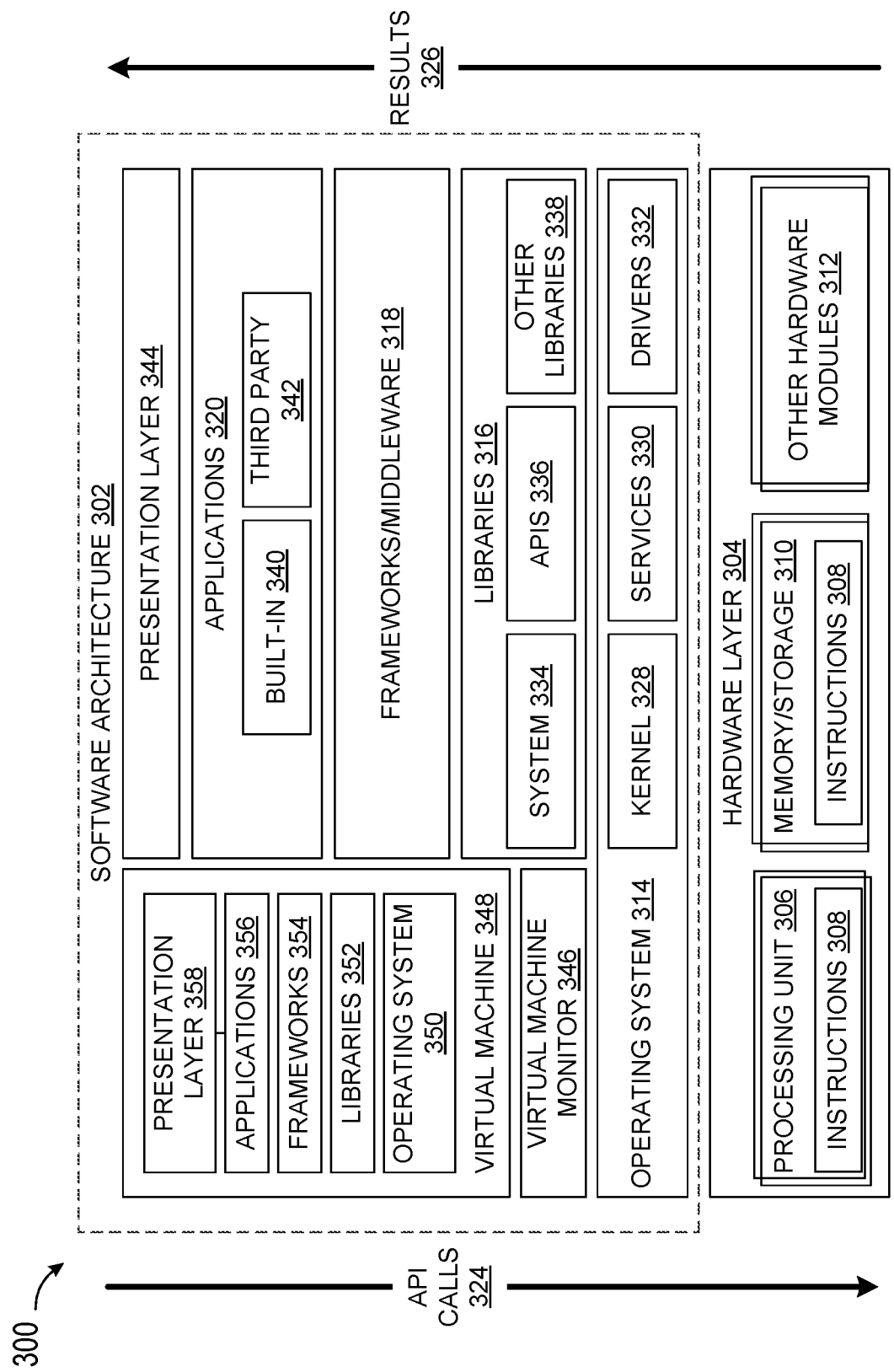
FIG. 3 is a block diagram illustrating an example software architecture, various portions of which may be used in conjunction with various hardware architectures herein described.

FIG. 3 is a block diagram 300 illustrating an example software architecture 302, various portions of which may be used in conjunction with various hardware architectures herein described, which may implement any of the above-described features. FIG. 3 is a non-limiting example of a software architecture and it will be appreciated that many other architectures may be implemented to facilitate the functionality described herein. The software architecture 302 may execute on hardware such as client devices, native application provider, web servers, server clusters, external services, and other servers. A representative hardware layer 304 includes a processing unit 306 and associated executable instructions 308. The executable instructions 308 represent executable instructions of the software architecture 302, including implementation of the methods, modules and so forth described herein.

The hardware layer 304 also includes a memory/storage 310, which also includes the executable instructions 308 and accompanying data. The hardware layer 304 may also include other hardware modules 312. Instructions 308 held by processing unit 308 may be portions of instructions 308 held by the memory/storage 310.

The example software architecture 302 may be conceptualized as layers, each providing various functionality. For example, the software architecture 302 may include layers and components such as an operating system (OS) 314, libraries 316, frameworks 318, applications 320, and a presentation layer 324. Operationally, the applications 320 and/or other components within the layers may invoke API calls 324 to other layers and receive corresponding results 326. The layers illustrated are representative in nature and other software architectures may include additional or different layers. For example, some mobile or special purpose operating systems may not provide the frameworks/middleware 318.

The OS 314 may manage hardware resources and provide common services. The OS 314 may include, for example, a kernel 328, services 330, and drivers 332. The kernel 328 may act as an abstraction layer between the hardware layer 304 and other software layers. For example, the kernel 328 may be responsible for memory management, processor management (for example, scheduling), component management, networking, security settings, and so on. The services 330 may provide other common services for the other software layers. The drivers 332 may be responsible for controlling or interfacing with the underlying hardware layer 304. For instance, the drivers 332 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 316 may provide a common infrastructure that may be used by the applications 320 and/or other components and/or layers. The libraries 316 typically provide functionality for use by other software modules to perform tasks, rather than rather than interacting directly with the OS 314. The libraries 316 may include system libraries 334 (for example, C standard library) that may provide functions such as memory allocation, string manipulation, file operations. In addition, the libraries 316 may include API libraries 336 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 316 may also include a wide variety of other libraries 338 to provide many functions for applications 320 and other software modules.

The frameworks 318 (also sometimes referred to as middleware) provide a higher-level common infrastructure that may be used by the applications 320 and/or other software modules. For example, the frameworks 318 may provide various GUI functions, high-level resource management, or high-level location services. The frameworks 318 may provide a broad spectrum of other APIs for applications 320 and/or other software modules.

The applications 320 include built-in applications 320 and/or third-party applications 322. Examples of built-in applications 320 may include, but are not limited to, a contacts application, a browser application, a location application, a media application, a messaging application, and/or a game application. Third-party applications 322 may include any applications developed by an entity other than the vendor of the particular system. The applications 320 may use functions available via OS 314, libraries 316, frameworks 318, and presentation layer 324 to create user interfaces to interact with users.

Some software architectures use virtual machines, as illustrated by a virtual machine 328. The virtual machine 328 provides an execution environment where applications/modules can execute as if they were executing on a hardware machine (such as the machine 400 of FIG. 4, for example). The virtual machine 328 may be hosted by a host OS (for example, OS 314) or hypervisor, and may have a virtual machine monitor 326 which manages operation of the virtual machine 328 and interoperation with the host operating system. A software architecture, which may be different from software architecture 302 outside of the virtual machine, executes within the virtual machine 328 such as an OS 350, libraries 352, frameworks 354, applications 356, and/or a presentation layer 358.

Figure 4:
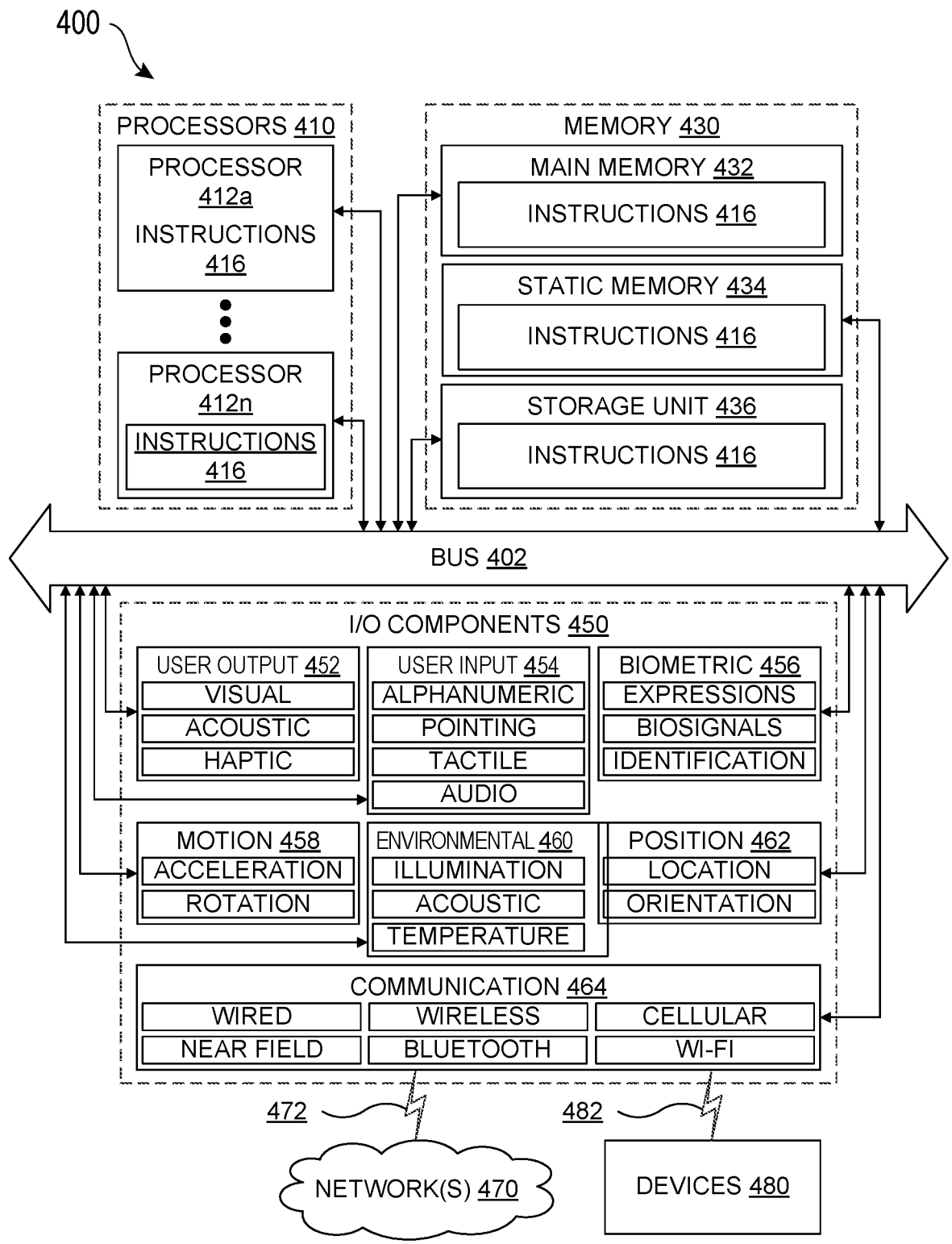
FIG. 4 is a block diagram illustrating components of an example machine configured to read instructions from a machine-readable medium and perform any of the features described herein.

FIG. 4 is a block diagram illustrating components of an example machine 400 configured to read instructions from a machine-readable medium (for example, a machine-readable storage medium) and perform any of the features described herein. The example machine 400 is in a form of a computer system, within which instructions 416 (for example, in the form of software components) for causing the machine 400 to perform any of the features described herein may be executed. As such, the instructions 416 may be used to implement methods or components described herein. The instructions 416 cause unprogrammed and/or unconfigured machine 400 to operate as a particular machine configured to carry out the described features. The machine 400 may be configured to operate as a standalone device or may be coupled (for example, networked) to other machines. In a networked deployment, the machine 400 may operate in the capacity of a server machine or a client machine in a server-client network environment, or as a node in a peer-to-peer or distributed network environment. Machine 400 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 400 is illustrated, the term "machine" include a collection of machines that individually or jointly execute the instructions 416.

The machine 400 may include processors 410, memory 430, and I/O components 450, which may be communicatively coupled via, for example, a bus 402. The bus 402 may include multiple buses coupling various elements of machine 400 via various bus technologies and protocols. In an example, the processors 410 (including, for example, a central processing unit (CPU), a graphics processing unit (GPU), a digital signal processor (DSP), an ASIC, or a suitable combination thereof) may include one or more processors 412a to 412n that may execute the instructions 416 and process data. In some examples, one or more processors 410 may execute instructions provided or identified by one or more other processors 410. The term "processor" includes a multi-core processor including cores that may execute instructions contemporaneously. Although FIG. 4 shows multiple processors, the machine 400 may include a single processor with a single core, a single processor with multiple cores (for example, a multi-core processor), multiple processors each with a single core, multiple processors each with multiple cores, or any combination thereof. In some examples, the machine 400 may include multiple processors distributed among multiple machines.

The memory/storage 430 may include a main memory 432, a static memory 434, or other memory, and a storage unit 436, both accessible to the processors 410 such as via the bus 402. The storage unit 436 and memory 432, 434 store instructions 416 embodying any one or more of the functions described herein. The memory/storage 430 may also store temporary, intermediate, and/or long-term data for processors 410. The instructions 416 may also reside, completely or partially, within the memory 432, 434, within the storage unit 436, within at least one of the processors 410 (for example, within a command buffer or cache memory), within memory at least one of I/O components 450, or any suitable combination thereof, during execution thereof. Accordingly, the memory 432, 434, the storage unit 436, memory in processors 410, and memory in I/O components 450 are examples of machine-readable media.

As used herein, "machine-readable medium" refers to a device able to temporarily or permanently store instructions and data that cause machine 400 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 416) for execution by a machine 400 such that the instructions, when executed by one or more processors 410 of the machine 400, cause the machine 400 to perform and one or more of the features described herein. Accordingly, a "machine-readable medium" may refer to a single storage device, as well as "cloud-based" storage systems or storage networks that include multiple storage apparatus or devices.

The I/O components 450 may include a wide variety of hardware components adapted to receive input, provide output, produce output, transmit information, exchange information, capture measurements, and so on. The specific I/O components 450 included in a particular machine will depend on the type and/or function of the machine. For example, mobile devices such as mobile phones may include a touch input device, whereas a headless server or IoT device may not include such a touch input device. The particular examples of I/O components illustrated in FIG. 4 are in no way limiting, and other types of components may be included in machine 400. The grouping of I/O components 450 are merely for simplifying this discussion, and the grouping is in no way limiting. In various examples, the I/O components 450 may include user output components 452 and user input components 454. User output components 452 may include, for example, display components for displaying information (for example, a liquid crystal display (LCD) or a projector), acoustic components (for example, speakers), haptic components (for example, a vibratory motor or force-feedback device), and/or other signal generators. User input components 454 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 450 may include biometric components 456 and/or position components 462, among a wide array of other environmental sensor components. The biometric components 456 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 462 may include, for example, location sensors (for example, a Global Position System (GPS) receiver), altitude sensors (for example, an air pressure sensor from which altitude may be derived), and/or orientation sensors (for example, magnetometers).

The I/O components 450 may include communication components 464, implementing a wide variety of technologies operable to couple the machine 400 to network(s) 470 and/or device(s) 480 via respective communicative couplings 472 and 482. The communication components 464 may include one or more network interface components or other suitable devices to interface with the network(s) 470. The communication components 464 may include, for example, components adapted to provide wired communication, wireless communication, cellular communication, Near Field Communication (NFC), Bluetooth communication, Wi-Fi, and/or communication via other modalities. The device(s) 480 may include other machines or various peripheral devices (for example, coupled via USB).

In some examples, the communication components 464 may detect identifiers or include components adapted to detect identifiers. For example, the communication components 464 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 462, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-2) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory storing executable instructions that, when executed by the processor, cause the data processing system to perform functions of:
receiving a software resource in a first language, the software resource being a resource used in a build process for a software application;
receiving data relating to a state of translations performed for the software application by a localization service;
determining based at least in part on the software resource in the first language and the data whether an up-to-date software resource in a second language exists in a data store, the software resource in the second language corresponding to the software resource in the first language;
upon determining that the up-to-date software resource in the second language exists in the data store, utilizing the up-to-date software resource in the build process; and
upon determining that the up-to-date software resource in the second language does not exist in the data store:
sending a request to the localization service to create the up-to-date software resource in the second language, and
upon creation of the up-to-date software resource in the second language, receiving a link to a location of the up-to-date software resource in the second language in the data store.

Item 2. The data processing system of item 1, wherein upon receiving the request, the localization service performs functions of:
sending a request to a third-party to provide a translation for the software resource in the first language;
receiving the translation for the software resource in the first language;
storing the translation in a database;
creating the up-to-date software resource in the second language based at least in part on the translation and the on the software resource in the first language;
transmitting the up-to-date software resource in the second language for storage in the data store; and
creating the link to the location of the up-to-date software resource in the second language; and
storing the link in a file in the data store.

Item 3. The data processing system of items 1 or 2, wherein the database includes a state for the translation of the software resource in the first language.

Item 4. The data processing system of any of the preceding items, wherein the file is a file manifest cache.

Item 5. The data processing system of any of the preceding items, wherein data relating to the state of translations performed for the software application are obtained from a reference file.

Item 6. The data processing system of any of the preceding items, wherein the reference file is provided by a snapshot service.

Item 7. The data processing system of any of the preceding items, wherein the localization service is a service external to the build process and the data store is a storage medium external to the build process and to the localization service.

Item 8. A method for providing a software resource in a second language, the software resource corresponding to a software resource in a first language, comprising:
receiving the software resource in the first language, the software resource being a resource used in a build process for a software application;
receiving data relating to a state of translations performed for the software application by a localization service;
determining based at least in part on the software resource in the first language and the data whether an up-to-date software resource in the second language exists in a data store;
upon determining that the up-to-date software resource in the second language exists in the data store, utilizing the up-to-date software resource in the build process; and
upon determining that the up-to-date software resource in the second language does not exist in the data store:
sending a request to the localization service to create the up-to-date software resource in the second language, and
upon creation of the up-to-date software resource in the second language, receiving a link to a location of the up-to-date software resource in the second language in the data store.

Item 9. The method of item 8, wherein upon receiving the request, the localization service performs functions of:
sending a request to a third-party to provide a translation for the software resource in the first language;
receiving the translation for the software resource in the first language;
storing the translation in a database;
creating the up-to-date software resource in the second language based at least in part on the translation and the on the software resource in the first language;
transmitting the up-to-date software resource in the second language for storage in the data store; and
creating the link to the location of the up-to-date software resource in the second language; and
storing the link in a file in the data store.

Item 10. The method of items 8 or 9, wherein the database includes a state for the translation of the software resource in the first language.

Item 11. The method of any of items 8-10, wherein data relating to the state of translations performed for the software application are obtained from a reference file.

Item 12. The method of any of items 8-11, wherein the reference file is provided by a snapshot service.

Item 13. The method of any of items 8-12, wherein the localization service is a service external to the build process and the data store is a storage medium external to the build process and to the localization service.

Item 14. A non-transitory computer readable medium on which are stored instructions that, when executed, cause a programmable device to:
  receive a software resource in a first language, the software resource being a resource used in a build process for a software application;
  receive data relating to a state of translations performed for the software application by a localization service;
  determine based at least in part on the software resource in the first language and the data whether an up-to-date software resource in a second language exists in a data store, the software resource in the second language corresponding to the software resource in the first language;
  upon determining that the up-to-date software resource in the second language exists in the data store, utilize the up-to-date software resource in the build process; and
  upon determining that the up-to-date software resource in the second language does not exist in the data store:
    send a request to the localization service to create the up-to-date software resource in the second language, and
    upon creation of the up-to-date software resource in the second, language receive a link to a location of the up-to-date software resource in the second language in the data store.

Item 15. The computer readable medium of item 14, wherein upon receiving the request, the localization service performs functions of:
  sending a request to a third-party to provide a translation for the software resource in the first language;
  receiving the translation for the software resource in the first language;
  storing the translation in a database;
  creating the up-to-date software resource in the second language based at least in part on the translation and the on the software resource in the first language;
  transmitting the up-to-date software resource in the second language for storage in the data store; and
  creating the link to the location of the up-to-date software resource in the second language; and
  storing the link in a file in the data store.

Item 16. The computer readable medium of items 14 or 15, wherein the database includes a state for the translation of the software resource in the first language.

Item 17. The computer readable medium of any of items 14-16, wherein the file is a file manifest cache.

Item 18. The computer readable medium of any of items 14-17, wherein data relating to the state of translations performed for the software application are obtained from a reference file.

Item 19. The computer readable medium of any of items 14-18, wherein the reference file is provided by a snapshot service.

Item 20. The computer readable medium of any of items 14-19, wherein the localization service is a service external to the build process and the data store is a storage medium external to the build process and to the localization service.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
  a processor; and a memory in communication with the processor, the memory comprising executable instructions that, when executed by the processor, cause the data processing system to perform functions of:

receiving a resource in a first language from a resource repository, the resource being a software resource file within that is used for building a software application in a build environment, the software application including a plurality of software resources and software code that together form the software application, and the resource repository being a repository for storing at least one of language neutral resources or resources in a default language;

receiving data from a snapshot service, the data relating to a state of translations performed for the software application by a localization service, the localization service creating software resource build outputs in one or more target languages and the snapshot service creating translation snapshots for software resource files, the translation snapshots including a state of software resource file translations at a given time;

determining, via a localization client tool, based at least in part on the resource in the first language and the data that an up-to-date software resource in a second language does not exist in a data store, the software resource in the second language corresponding to the resource in the first language; and upon determining that the up-to-date software resource in the second language does not exist in the data store:

automatically sending a request to the localization service to create the up-to-date software resource in the second language, and upon creation of the up-to-date software resource in the second language, receiving a link to a location of the up-to-date software resource in the second language in the data store, wherein:

the second language is a one of the one or more target languages, the resource repository does not store software resources in any of the one or more target languages, and the localization service is achieved by setting a flag that indicates that the software resource file is a localization target suitable for translations.

2. The data processing system of claim 1, wherein upon receiving the request, the localization service performs functions of:

sending a request to a third-party to provide a translation of the resource from the first language to the second language;

receiving the translation for the resource in the second language;

storing the translation in a database;

creating the up-to-date software resource in the second language based at least in part on the translation and on the resource in the first language;

transmitting the up-to-date software resource in the second language for storage in the data store;

creating the link to the location of the up-to-date software resource in the second language; and storing the link in a file in the data store.

3. The data processing system of claim 2, wherein the database includes a state for the translation of the resource to the second language.

4. The data processing system of claim 2, wherein the file is a file manifest cache.

5. The data processing system of claim 1, wherein data relating to the state of translations performed for the software application are obtained from a reference file.

6. The data processing system of claim 5, wherein the reference file is provided by the snapshot service.

7. The data processing system of claim 1, wherein the data store is a storage medium external to the build environment and to the localization service.

8. A method for providing a software resource in a second language, the software resource corresponding to a software resource in a first language, comprising:

receiving a resource in a first language from a resource repository, the resource being a software resource file that is used for building a software application in a build environment, the software application including a plurality of software resources and software code that together form the software application, and the resource repository being a repository for storing at least one of language neutral software resources or resources in a default language;

receiving data from a snapshot service, the data relating to a state of translations performed for the software application by a localization service, the localization service creating software resource build outputs in one or more target languages and the snapshot service creating translation snapshots for software resource files, the translation snapshots including a state of software resource file translations at a given time;

determining, via a localization client tool, based at least in part on the resource in the first language and the data that an up-to-date software resource in a second language does not exist in a data store, the software resource in the second language corresponding to the resource in the first language; and upon determining that the up-to-date software resource in the second language does not exist in the data store:

automatically sending a request to the localization service to create the up- to-date software resource in the second language, and upon creation of the up-to-date software resource in the second language, receiving a link to a location of the up-to-date software resource in the second language in the data store, wherein:

the second language is a one of the one or more target languages, the resource repository does not store software resources in any of the one or more target languages; and the localization service is achieved by setting a flag that indicates that the software resource file is a localization target suitable for translations.

9. The method of claim 8, wherein upon receiving the request, the localization service performs functions of:

sending a request to a third-party to provide a translation of the resource in from the first language to the second language;

receiving the translation for the resource in the second language;

storing the translation in a database;

creating the up-to-date software resource in the second language based at least in part on the translation and on the resource in the first language;

transmitting the up-to-date software resource in the second language for storage in the data store;

creating the link to the location of the up-to-date software resource in the second language; and storing the link in a file in the data store.

10. The method of claim 9, wherein the database includes a state for the translation of the resource to the second language.

11. The method of claim 8, wherein data relating to the state of translations performed for the software application are obtained from a reference file.

12. The method of claim 11, wherein the reference file is provided by the snapshot service.

13. The method of claim 8, wherein the data store is a storage medium external to the build environment and to the localization service.

14. A non-transitory computer readable medium on which are stored instructions that, when executed, cause a programmable device to:

receive a resource in a first language from a resource repository, the resource being a software resource file that is used for building a software application in a build environment, the software application including a plurality of software resources and software code that together form the software application, and the resource repository being a repository for storing at least one of language neutral software resources or resources in a default language;

receiving data from a snapshot service, the data relating to a state of translations performed for the software application by a localization service, the localization service creating software resource build outputs in one or more target languages and the snapshot service creating translation snapshots for software resource files, the translation snapshots including a state of software resource file translations at a given time;

determine, via a localization client tool, based at least in part on the resource in the first language and the data that an up-to-date software resource in a second language does not exist in a data store, the software resource in the second language corresponding to the resource in the first language; and upon determining that the up-to-date software resource in the second language does not exist in the data store:
automatically send a request to the localization service to create the up-to-date software resource in the second language, and upon creation of the up-to-date software resource in the second language, receiving a link to a location of the up-to-date software resource in the second language in the data store, wherein:
the second language is a one of the one or more target languages, the resource repository does not store software resources in any of the one or more target languages; and
the localization service is achieved by setting a flag that indicates that the software resource file is a localization target suitable for translations.

15. The computer readable medium of claim 14, wherein upon receiving the request, the localization service performs functions of:

sending a request to a third-party to provide a translation of the resource in from the first language to the second language;

receiving the translation for the resource in the second language;

storing the translation in a database;

creating the up-to-date software resource in the second language based at least in part on the translation and on the resource in the first language;

transmitting the up-to-date software resource in the second language for storage in the data store;

creating the link to the location of the up-to-date software resource in the second language; and storing the link in a file in the data store.

16. The computer readable medium of claim 15, wherein the database includes a state for the translation of the resource to the second language.

17. The computer readable medium of claim 15, wherein the file is a file manifest cache.

18. The computer readable medium of claim 14, wherein data relating to the state of translations performed for the software application are obtained from a reference file.

19. The computer readable medium of claim 18, wherein the reference file is provided by the snapshot service.

20. The computer readable medium of claim 14, wherein the data store is a storage medium external to the build environment and to the localization service.

* * * * *